(12) United States Patent
Abler et al.

(10) Patent No.: US 12,037,476 B2
(45) Date of Patent: Jul. 16, 2024

(54) USES OF MINERAL FILLERS

(71) Applicant: IMERTECH SAS, Paris (FR)

(72) Inventors: Caroline Abler, Roquettes (FR); Gilles Meli, Frantoupin (FR)

(73) Assignee: ImerTech SAS, Paris (FR)

( * ) Notice: Subject to any disclaimer, the term of this patent is extended or adjusted under 35 U.S.C. 154(b) by 754 days.

(21) Appl. No.: 17/251,382

(22) PCT Filed: Jun. 11, 2019

(86) PCT No.: PCT/EP2019/065229
§ 371 (c)(1),
(2) Date: Dec. 11, 2020

(87) PCT Pub. No.: WO2019/238690
PCT Pub. Date: Dec. 19, 2019

(65) Prior Publication Data
US 2021/0253825 A1    Aug. 19, 2021

(30) Foreign Application Priority Data
Jun. 12, 2018   (EP) ..................... 18305721

(51) Int. Cl.
C08K 3/34       (2006.01)
C08K 5/103      (2006.01)
C08K 7/00       (2006.01)

(52) U.S. Cl.
CPC ............. *C08K 3/346* (2013.01); *C08K 5/103* (2013.01); *C08K 7/00* (2013.01)

(58) Field of Classification Search
None
See application file for complete search history.

(56) References Cited

U.S. PATENT DOCUMENTS

| 4,248,810 A | 2/1981 | Erskine |
| 4,504,617 A | 3/1985 | Yui et al. |
| 5,326,806 A * | 7/1994 | Yokoshima ........... C08K 3/2279 524/412 |
| 5,576,617 A | 11/1996 | Webb et al. |
| 5,827,917 A * | 10/1998 | Fourty ..................... B29B 9/06 524/451 |
| 6,132,744 A * | 10/2000 | Chehab ................. A61Q 19/00 424/490 |
| 8,642,683 B1 | 2/2014 | Dellock et al. |
| 2004/0014854 A1 * | 1/2004 | Watanabe ............... C08L 53/00 524/515 |
| 2013/0091682 A1 | 4/2013 | Zhang et al. |
| 2015/0152254 A1 * | 6/2015 | Shimano ................ C08L 23/10 524/456 |
| 2015/0159365 A1 | 6/2015 | Goletto et al. |
| 2018/0327609 A1 | 11/2018 | Makino et al. |

FOREIGN PATENT DOCUMENTS

| CN | 1760270 A | 4/2006 |
| CN | 101698726 A | 4/2010 |
| CN | 101759920 A | 6/2010 |
| CN | 101759920 B | 6/2013 |
| CN | 105189650 A | 12/2015 |
| CN | 105189650 B | 6/2017 |
| EP | 2239298 B1 | 6/2011 |
| JP | 2002-3692 A | 1/2002 |
| JP | 2012-180469 A | 9/2012 |
| JP | 2013-534958 A | 9/2013 |
| JP | 2015-127405 A | 7/2015 |
| JP | 2018-80841 A | 5/2018 |
| WO | WO97/22730 | 6/1997 |
| WO | WO 2005/098553 A2 | 10/2005 |
| WO | 2018146222 A1 | 8/2018 |
| WO | WO 2019/070193 A1 | 4/2019 |

OTHER PUBLICATIONS

NYC NYGLOS 8 Wollastonite data sheet, Aug. 10, 2023 (Year: 2023).*
Imerys Performance Additives: "Luzenac 10M00S"; Aug. 8, 2016; retrieved from the Internet: URL:https://www.imerys-performance-minerals.com/system/files/2018-04/DATT Pol Luzenac 10MOOS 2016-08.pdf [retrieved on Nov. 23, 2022].
International Search Report and Written Opinion dated Dec. 7, 2019, in International Application No. PCT/EP2019/065229.
Baudet, G., The British Library, On Demand. Comparaison de methodes d'analyses granulometriques, application du granulomere a laser a la determination du coefficient de forme des particules (8 pages).
Search Report in counterpart Chinese Application No. 201980038082.X, dated Sep. 23, 2022, (6 pages, including translation).

* cited by examiner

*Primary Examiner* — Christopher M Rodd
(74) *Attorney, Agent, or Firm* — Finnegan, Henderson Farabow, Garrett & Dunner, LLP (57) ABSTRACT

A mineral filler comprising talc and wollastonite is used in a polymer composition to improve the scratch resistance and/or reduce the thermal expansion coefficient anisotropy of the polymer composition.

20 Claims, 3 Drawing Sheets

USES OF MINERAL FILLERS

CLAIM FOR PRIORITY

This application is a U.S. national phase entry under 35 U.S.C. § 371 from PCT International Application No. PCT/EP2019/065229, filed Jun. 11, 2019, which claims the benefit of priority of European Patent Application No. 18305721.5, filed Jun. 12, 2018, from both of which this application claims priority and both of which are incorporated herein by reference.

TECHNICAL FIELD

The present invention is directed to uses of mineral fillers comprising talc and wollastonite in polymer compositions to improve scratch resistance and reduce thermal expansion coefficient anisotropy, to uses of talc in mineral fillers containing wollastonite to improve incorporation of wollastonite into polymer compositions and to improve compactability of mineral fillers, to mineral fillers comprising talc and wollastonite, to polymer compositions comprising such mineral fillers, and to articles of manufacture formed from such polymer compositions.

BACKGROUND TO THE INVENTION

Mineral fillers are added to polymer compositions as functional fillers to modify, enhance or modulate electrical, physical, mechanical, thermal or optical properties of the polymer compositions. Mineral fillers may also be added to polymer compositions as extender fillers, for example in inks or paints. For example, talc fillers are typically added to polymer compositions to provide stiffness and wollastonite fillers are typically added to polymer compositions to provide strength.

SUMMARY OF THE INVENTION

According to a first aspect, the present invention is directed to use of a mineral filler comprising talc and wollastonite in a polymer composition to modify, for example, improve, the scratch resistance and/or modify, for example, reduce, the thermal expansion coefficient anisotropy of the polymer composition.

According to a second aspect, the present invention is directed to a method of modifying, for example, improving, the scratch resistance and/or modifying, for example, reducing the thermal expansion coefficient anisotropy of a polymer composition, wherein the method comprises adding a mineral filler comprising talc and wollastonite to the polymer composition.

According to a third aspect, the present invention is directed to a mineral filler for a polymer composition, the mineral filler comprising, based on the total weight of non-aqueous components in the mineral filler: from about 25.0 wt. % to about 75.0 wt. %, for example, from about 40.0 wt. % to about 60.0 wt. %, of talc; from about 25.0 wt. % to about 75.0 wt. %, for example, from about 40.0 wt. % to about 60.0 wt. %, of wollastonite; and from about 0.1 wt. % to about 10.0 wt. %, for example, from about 0.1 wt. % to about 5.0 wt. %, or from about 0.1 wt. % to about 1.0 wt. %, or from about 0.1 wt. % to about 0.9 wt. %, or from about 0.3 wt. % to about 0.7 wt. %, of organic binder.

According to a fourth aspect, the present invention is directed to a polymer composition comprising a mineral filler in accordance with the third aspect of the invention.

According to a fifth aspect, the present invention is directed to an article of manufacture, for example, an automotive component, comprising, for example, formed from, a polymer composition, wherein the polymer composition comprises a mineral filler comprising talc and wollastonite.

According to a sixth aspect, the present invention is directed to use of talc in a wollastonite-containing mineral filler to modify, for example, improve or increase, incorporation of wollastonite into a polymer composition on addition of the wollastonite-containing mineral filler to the polymer composition.

According to a seventh aspect, the present invention is directed to a method of modifying, for example, improving or increasing, incorporation of wollastonite into a polymer composition on addition of a wollastonite-containing mineral filler to the polymer composition, the method comprising adding talc to the wollastonite-containing mineral filler.

According to an eighth aspect, the present invention is directed to use of talc in a wollastonite-containing mineral blend to modify, for example, improve or increase, the compactibility of the wollastonite-containing mineral blend.

According to a ninth aspect, the present invention is directed to a method of modifying, for example, improving or increasing, the compactibility of a wollastonite-containing mineral blend, the method comprising adding talc to the wollastonite-containing mineral blend.

DETAILED DESCRIPTION OF THE INVENTION

It has surprisingly been found that the addition of a mineral filler comprising talc and wollastonite to a polymer composition may improve the scratch resistance and reduce the thermal expansion coefficient anisotropy of the polymer composition. It has also been found that the addition of talc to a wollastonite-containing mineral filler may improve (e.g. increase) the compactibility of the wollastonite-containing mineral filler and may improve (e.g. increase) the incorporation of wollastonite into a polymer composition on addition of the wollastonite-containing mineral filler to the polymer composition.

Talc

Throughout this specification and the appended claims, the term "talc" refers to either the magnesium silicate mineral, or the mineral chlorite (i.e. magnesium aluminium silicate), or a mixture of the two, optionally associated with other minerals, for example, dolomite and/or magnesite, or furthermore, synthetic talc, also known as talcose.

The talc may be micronized talc. The talc may have a monomodal particle size distribution. The talc may have a polymodal particle size distribution, for example, a bimodal particle size distribution. The talc may be cationic talc. The talc may comprise one or more of the following: micronized talc, monomodal talc, bimodal talc, cationic talc, or mixtures thereof.

The talc may have a platy particle morphology.

Particle size properties referred to herein may be measured in a well-known manner by sedimentation of the particulate filler or material in a fully dispersed condition in an aqueous medium using a Sedigraph 5100 machine as supplied by Micromeritics Instruments Corporation, Norcross, Georgia, USA (web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{98}$, $d_{90}$ and the $d_{10}$ are the values determined in this way of the particle e.s.d. at which there are 98%, 90% and 10% respectively by weight of the particles which have an equivalent spherical diameter less than that $d_{98}$, $d_{90}$ or $d_{10}$ value.

Particle size properties may also be measured by wet Malvern laser scattering (standard ISO 13320-1). In this technique, the size of particles in powders, suspensions and emulsions may be measured using the diffraction of a laser beam, based on the application of Mie theory. Such a machine, for example a Malvern Mastersizer S (as supplied by Malvern instruments) provides measurements and a plot of the cumulative percentage by volume of particles having a size, referred to in the art as the "equivalent spherical diameter" (e.s.d), less than given e.s.d values. The mean particle size $d_{50}$ is the value determined in this way of the particle e.s.d. at which there are 50% by volume of the particles which have an equivalent spherical diameter less than that $d_{50}$ value. For the avoidance of doubt, the measurement of particle size using laser light scattering is not an equivalent method to the sedimentation method referred to above.

As used herein, the term "lamellarity index" is defined by the following ratio:

$$d_{mean} - d_{50}/d_{50}$$

in which "$d_{mean}$" is the value of the mean particle size ($d_{50}$) obtained by a particle size measurement by wet Malvern laser scattering (standard AFNOR NFX11-666 or ISO 13329-1) and "$d_{50}$" is the value of the median diameter obtained by sedimentation using a sedigraph (standard AFNOR X11-683 or ISO 13317-3), as described below. Reference may be made to the article by G. Baudet and J. P. Rona, Ind. Min. Mines et Carr. Les techn. June, July 1990, pp 55-61, which shows that this index is correlated to the mean ratio of the largest dimension of the particle to its smallest dimension.

"Shape factor", as used herein, is a measure of the ratio of particle diameter to particle thickness for a population of particles of varying size and shape as measured using the electrical conductivity methods, apparatuses, and equations described in U.S. Pat. No. 5,576,617, which is incorporated herein by reference. As the technique for determining shape factor is further described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

The talc may have a $d_{50}$ (measured by sedigraph) of no greater than about 15.0 μm, for example, no greater than about 10.0 μm, or no greater than about 5.0 μm, or no greater than about 3.0 μm, or no greater than about 2.0 μm, or no greater than about 1.5 μm. The talc may have a $d_{50}$ (by sedigraph) of no less than about 0.05 μm, for example, or no less than about 0.1 μm, or no less than about 0.5 μm. The talc may have a $d_{50}$ (by sedigraph) of from 0.05 μm to about 15.0 μm, for example, from about 0.1 μm to about 10.0 μm, or from about 0.1 μm to about 5.0 μm, or from about 0.5 μm to about 3.0 μm, or from about 0.5 μm to about 2.0 μm, or from about 0.5 μm to about 1.5 μm, for example, about 1.0 μm, or about 1.1 μm. The talc may have a $d_{50}$ (measured by sedigraph) of or from about 0.8 μm to about 2.0 μm, or from about 0.9 μm to about 1.9 μm, or from about 1.0 μm to about 1.6 μm, or from about 1.1 μm to about 1.5 μm, or from about 1.2 μm to about 1.4 μm.

The talc may have a $d_{50}$ (measured by laser diffraction) of no greater than about 20.0 μm, for example, no greater than about 15.0 μm, or no greater than about 10.0 μm, or no greater than about 8.0 μm, or no greater than about 6.0 μm, or no greater than about 5.0 μm, or no greater than about 4.0 μm. The talc may have a $d_{50}$ (by laser diffraction) of no less than about 0.05 μm, for example, or no less than about 0.1 μm, or no less than about 0.5 μm, or no less than 1.0 μm, or no less than about 2.0 μm, or no less than about 3.0 μm, or no less than about 4.0 μm. The talc may have a $d_{50}$ (by laser diffraction) of from 0.05 μm to about 20.0 μm, for example, from about 0.1 μm to about 15.0 μm, or from about 0.1 μm to about 10.0 μm, or from about 0.5 μm to about 10.0 μm, or from about 0.5 μm to about 8.0 μm, or from about 1.0 μm to about 6.0 μm, or from about 2.0 μm to about 8.0 μm, or from about 2.0 μm to about 6.0 μm, or from about 3.0 μm to about 6.0 μm, or from about 3.0 μm to about 5.0 μm, or from about 4.0 μm to about 6.0 μm, for example, about 3.9 μm, or about 4.0 μm, or about 5.0 μm. The talc may have a $d_{50}$ (measured by laser diffraction) of from about 3.0 μm to about 4.5 μm, or from about 3.5 μm to about 4.5 μm, or from about 3.7 μm to about 4.3 μm.

The talc may have a $d_{95}$ (measured by sedigraph) of no greater than about 15.0 μm, for example, no greater than about 10.0 μm, or no greater than about 85.0 μm, or no greater than about 5.0 μm, or no greater than about 4.0 μm. The talc may have a $d_{95}$ (by sedigraph) of no less than about 0.1 μm, for example, or no less than about 0.5 μm, or no less than about 1.0 μm, or no less than about 2.0 μm, or no less than about 3.0 μm. The talc may have a $d_{95}$ (by sedigraph) of from 0.1 μm to about 15.0 μm, for example, from about 0.1 μm to about 8.0 μm, or from about 0.5 μm to about 5.0 μm, or from about 1.0 μm to about 5.0 μm, or from about 2.0 μm to about 5.0 μm, or from about 3.0 μm to about 4.0 μm, for example, about 3.4 μm.

The talc may have a $d_{95}$ (measured by laser diffraction) of no greater than about 20.0 μm, for example, no greater than about 15.0 μm, or no greater than about 10.0 μm, or no greater than about 9.0 μm, or no greater than about 8.0 μm. The talc may have a $d_{95}$ (by laser diffraction) of no less than 0.1 μm, for example, or no less than about 0.5 μm, or no less than 1.0 μm, or no less than about 2.0 μm, or no less than about 3.0 μm, or no less than about 4.0 μm, or no less than about 5.0 μm, or no less than about 6.0 μm, or no less than about 7.0 μm. The talc may have a $d_{95}$ (by laser diffraction) of from 0.1 μm to about 20.0 μm, for example, from about 0.5 μm to about 15.0 μm, or from about 0.5 μm to about 10.0 μm, or from about 1.0 μm to about 10.0 μm, or from about 2.0 μm to about 10.0 μm, or from about 3.0 μm to about 10.0 μm, or from about 4.0 μm to about 10.0 μm, or from about 5.0 µm to about 10.0 µm, or from about 6.0 µm to about 9.0 µm, or from about 7.0 µm to about 9.0 µm, or from about 7.0 µm to about 8.0 µm, for example, about 7.0 µm, or about 8.0 µm, or about 7.8 µm.

The talc may have a shape factor equal to or greater than 15, for example, equal to or greater than 20, or equal to or greater than 30, or equal to or greater than 40, or equal to or greater than 50, or equal to or greater than 60, or equal to or greater than 70, for example, equal to or greater than 80 or equal to or greater than 90. In certain embodiments the talc particulate has a shape factor equal to or less than 150, for example equal to or less than 130, for example equal to or less than 110. In certain embodiments the shape factor is from 15 to 150, or 15 to 130, or 15 to 110, or 30 to 150, or 30 to 130, or 30 to 110, or 40 to 150, or 40 to 130 or 40 to 110, or 70 to 150 or 70 to 130 or 70 to 110. In such embodiments, the talc may have a $d_{50}$ (measured by sedigraph) of no greater than about 15.0 µm, for example, no greater than about 10.0 µm, or no greater than about 5.0 µm, for example, from about 0.5 to 5.0 µm, or from about 1.0 to 4.0 µm, or from about 1.0 to 3.0 µm.

The talc may have a lamellarity index of at least about 2.2, for example, at least about 2.4, or at least about 2.6, or at least about 2.8. In certain embodiments, the talc has a lamellarity index of no greater than about 5.0, for example, no greater than about 4.0, or no greater than about 3.0. In certain embodiments, the talc has a lamellarity index of from about 2.2 to about 5.0, for example, from about 2.2 to about 4.0, or from about 2.2 to about 3.0, for example, from about 2.4 to about 4.0, or from about 2.4 to about 3.0, or from about 2.6 to about 4.0, or from about 2.6 to about 3.0, or from about 2.8 to about 4.0 or from about 2.8 to about 3.0, for example, about 2.9. In such embodiments, the talc may have a $d_{50}$ (measured by sedigraph) of no greater than about 15.0 µm, for example, no greater than about 10.0 µm, or no greater than about 5.0 µm, for example, from about 0.05 to 5.0 µm, or from about 0.1 to 4.0 µm, or from about 0.5 to 2.0 µm.

The mineral filler may comprise no greater than about 90.0 wt. %, for example, no greater than about 85.0 wt. %, or no greater than about 80.0 wt. %, or no greater than about 75.0 wt. %, or no greater than about 70.0 wt. %, or no greater than about 65.0 wt. %, or no greater than about 60.0 wt. %, or no greater than about 55.0 wt. %, or no greater than about 50.0 wt. %, or no greater than about 45.0 wt. %, or no greater than about 40.0 wt. %, or no greater than about 35.0 wt. %, or no greater than about 30.0 wt. %, or no greater than about 25.0 wt. %, or no greater than about 20.0 wt. %, or no greater than about 15.0 wt. %, or no greater than about 10.0 wt. %, of talc, based on the total weight of non-aqueous components in the mineral filler. The mineral filler may comprise no less than about 10.0 wt. %, for example, no less than about 15.0 wt. %, or no less than about 20.0 wt. %, or no less than about 25.0 wt. %, or no less than about 30.0 wt. %, or no less than about 35.0 wt. %, or no less than about 40.0 wt. %, or no less than about 45.0 wt. %, or no less than about 50.0 wt. %, or no less than about 55.0 wt. %, or no less than about 60.0 wt. %, or no less than about 65.0 wt. %, or no less than about 70.0 wt. %, or no less than about 75.0 wt. %, or no less than about 80.0 wt. %, or no less than about 85.0 wt. %, or no less than about 90.0 wt. %, of talc, based on the total weight of non-aqueous components in the mineral filler. The mineral filler may comprise from about 10.0 wt. % to about 90.0 wt. %, for example, from about 25.0 wt. % to about 75.0 wt. %, or from about 40.0 wt. % to about 60.0 wt. %, or from about 45.0 wt. % to about 55.0 wt. %, of talc, based on the total weight of non-aqueous components in the mineral filler.

Wollastonite

Throughout this specification and the appended claims, the term "wollastonite" refers to the calcium inosilicate mineral ($CaSiO_3$), which may also contain small amounts of iron, magnesium and/or manganese substituting for calcium. Wollastonite may also contain associated minerals such as garnets, vesuvianite, diopside, tremolite, epidote, plagioclase feldspar, pyroxene and calcite.

The wollastonite may be a finely divided wollastonite. The wollastonite may have a monomodal particle size distribution. The wollastonite may have a polymodal particle size distribution, for example, a bimodal particle size distribution.

The wollastonite may have a $d_{50}$ (measured by laser scattering) of no greater than about 20.0 µm, for example, no greater than about 15.0 µm, or no greater than about 10.0 µm, or no greater than about 9.0 µm, or no greater than about 8.0 µm. The wollastonite may have a $d_{50}$ (by laser scattering) of no less than about 0.1 µm, for example, or no less than about 1.0 µm, or no less than about 3.0 µm, or no less than about 5.0 µm, or no less than about 6.0 µm. The wollastonite may have a $d_{50}$ (by laser scattering) of from 0.1 µm to about 20.0 µm, for example, from about 1.0 µm to about 15.0 µm, or from about 3.0 µm to about 10.0 µm, or from about 5.0 µm to about 9.0 µm, or from about 6.0 µm to about 8.0 µm, for example, about 7.0 µm.

The wollastonite may have a needle-shaped (i.e. acicular) particle morphology.

The wollastonite may have an average particle diameter of no greater than about 20.0 µm, for example, no greater than about 15.0 µm, or no greater than about 10.0 µm. The wollastonite may have an average particle diameter of no less than about 0.5 µm, for example, no less than about 1.0 µm, or no less than about 3.0 µm. The wollastonite may have an average particle diameter of from about 0.5 µm to about 20.0 µm, for example, from about 1.0 µm to about 15.0 µm, or from about 3.0 µm to about 10.0 µm.

Average particle length may be measured using scanning electron microscopy (SEM). The wollastonite may have an average particle length of no greater than about 150.0 µm, for example, no greater than about 100.0 µm, or no greater than about 80.0 µm. The wollastonite may have an average particle length of no less than about 10.0 µm, for example, no less than about 20.0 µm, or no less than about 30.0 µm, or no less than about 40.0 µm. The wollastonite may have an average particle diameter of from about 10.0 µm to about 150.0 µm, for example, from about 20.0 µm to about 100.0 µm, or from about 30.0 µm to about 80.0 µm, or from about 40.0 µm to about 80.0 µm.

The mineral filler may comprise no greater than about 90.0 wt. %, for example, no greater than about 85.0 wt. %, or no greater than about 80.0 wt. %, or no greater than about 75.0 wt. %, or no greater than about 70.0 wt. %, or no greater than about 65.0 wt. %, or no greater than about 60.0 wt. %, or no greater than about 55.0 wt. %, or no greater than about 50.0 wt. %, or no greater than about 45.0 wt. %, or no greater than about 40.0 wt. %, or no greater than about 35.0 wt. %, or no greater than about 30.0 wt. %, or no greater than about 25.0 wt. %, or no greater than about 20.0 wt. %, or no greater than about 15.0 wt. %, or no greater than about 10.0 wt. %, of wollastonite, based on the total weight of non-aqueous components in the mineral filler. The mineral filler may comprise no less than about 10.0 wt. %, for example, no less than about 15.0 wt. %, or no less than about 20.0 wt. %, or no less than about 25.0 wt. %, or no less than about 30.0 wt. %, or no less than about 35.0 wt. %, or no less than about 40.0 wt. %, or no less than about 45.0 wt. %, or no less than about 50.0 wt. %, or no less than about 55.0 wt. %, or no less than about 60.0 wt. %, or no less than about 65.0 wt. %, or no less than about 70.0 wt. %, or no less than about 75.0 wt. %, or no less than about 80.0 wt. %, or no less than about 85.0 wt. %, or no less than about 90.0 wt. %, of wollastonite, based on the total weight of non-aqueous components in the mineral filler. The mineral filler may comprise from about 10.0 wt. % to about 90.0 wt. %, for example, from about 25.0 wt. % to about 75.0 wt. %, or from about 40.0 wt. % to about 60.0 wt. %, or from about 45.0 wt. % to about 55.0 wt. %, of wollastonite, based on the total weight of non-aqueous components in the mineral filler.

Organic Binder

The mineral filler may comprise an organic binder. The organic binder may be selected from stearic acid or its salts, paraffin, glycerol monostearate, polyethylene glycol, ethylene-vinyl acetate, a blend of fatty ester copolymers with acidic groups, polyoxyethylene stearate, propylene glycol monostearate, alkyl or ester modified siloxane, alkane sulfonate, or mixtures thereof. Stearic acid salts may be selected from magnesium stearate or zinc stearate.

The mineral filler may comprise no greater than about 10.0 wt. %, for example, no greater than about 9.0 wt. %, or no greater than about 8.0 wt. %, or no greater than about 7.0 wt. %, or no greater than about 6.0 wt. %, or no greater than about 5.0 wt. %, or no greater than about 4.0 wt. %, or no greater than about 3.0 wt. %, or no greater than about 2.0 wt. %, or no greater than about 1.0 wt. %, or no greater than about 0.9 wt. %, or no greater than about 0.8 wt. %, or no greater than about 0.7 wt. %, or no greater than about 0.6 wt. %, or no greater than about 0.5 wt. %, of organic binder, based on the total weight of non-aqueous components in the mineral filler. The mineral filler may comprise no less than about 0.05 wt. %, for example, no less than about 0.1 wt. %, or no less than about 0.3 wt. %, or no less than about 0.4 wt. %, or no less than about 0.5 wt. %, of organic binder, based on the total weight of non-aqueous components in the mineral filler. The mineral filler may comprise from about 0.05 wt. %, to about 10.0 wt. %, for example, from about 0.1 wt. % to about 7.0 wt. %, or from about 0.1 wt. % to about 5.0 wt. %, or from about 0.05 wt. % to about 1.0 wt. %, or from about 0.1 wt. % to about 1.0 wt. %, or from about 0.05 wt. % to about 0.9 wt. %, or from about 0.1 wt. % to about 0.9 wt. %, or from about 0.5 wt. % to about 0.9 wt. %, or from about 0.1 wt. % to about 0.5 wt. %, or from about 0.3 wt. % to about 0.7 wt. %, or from about 0.4 wt. % to about 0.6 wt. %, of organic binder, based on the total weight of non-aqueous components in the mineral filler.

Mineral Filler

The mineral filler typically comprises both talc and wollastonite, and, optionally, organic binder. The mineral filler may additionally comprise water.

It may be that the ratio of the weight of talc to the weight of wollastonite in the mineral filler is no greater than about 4:1, for example, no greater than about 3:1, or no greater than about 2:1, or no greater than about 3:2, or no greater than about 1:1. It may be that the ratio of the weight of talc to the weight of wollastonite in the mineral filler is no less than about 1:4, for example, no less than about 1:3, or no less than about 1:2, or no less than about 2:3, or no less than about 1:1. It may be that the ratio of the weight of talc to the weight of wollastonite in the mineral filler is from about 1:4 to about 4:1, for example, from about 1:3 or to about 3:1, or from about 1:2 to about 2:1, or from about 2:3 to about 3:2.

It may be that the ratio of the weight of talc to the weight of wollastonite in the mineral filler is about 1:1.

It may be that the mineral filler comprises from about 25.0 wt. % to about 75.0 wt. % of talc and from about 25.0 wt. % to about 75.0 wt. % of wollastonite, for example, from about 40.0 wt. % to about 60.0 wt. % of talc and from about 40.0 wt. % to about 60.0 wt. % of wollastonite, or from about 45.0 wt. % to about 55.0 wt. % of talc and from about from about 45.0 wt. % to about 55.0 wt. % of wollastonite, based on the total weight of non-aqueous components in the mineral filler.

It may be that the mineral filler comprises from about 25.0 wt. % to about 75.0 wt. % of talc and from about 25.0 wt. % to about 75.0 wt. % of wollastonite and from about 0.1 wt. % to about 10.0 wt. % of organic binder, for example, from about 40.0 wt. % to about 60.0 wt. % of talc and from about 40.0 wt. % to about 60.0 wt. % of wollastonite and from about 0.1 wt. % to about 7.0 wt. % of organic binder, or from about 45.0 wt. % to about 55.0 wt. % of talc and from about from about 45.0 wt. % to about 55.0 wt. % of wollastonite and from about 0.1 wt. % to about 5.0 wt. % of organic binder, based on the total weight of non-aqueous components in the mineral filler.

It may be that the mineral filler comprises, based on the total weight of non-aqueous components in the mineral filler: from about 25.0 wt. % to about 75.0 wt. %, for example, from about 40.0 wt. % to about 60.0 wt. %, of talc; from about 25.0 wt. % to about 75.0 wt. %, for example, from about 40.0 wt. % to about 60.0 wt. %, of wollastonite; and from about 0.1 wt. % to about 10.0 wt. %, for example, from about 0.1 wt. % to about 5.0 wt. %, or from about 0.1 wt. % to about 1.0 wt. %, or from about 0.1 wt. % to about 0.9 wt. %, or from about 0.3 wt. % to about 0.7 wt. %, of organic binder. It may be that the mineral filler comprises, based on the total weight of non-aqueous components in the mineral filler: from about 45.0 wt. % to about 55.0 wt. % of talc; from about 45.0 wt. % to about 55.0 wt. % of wollastonite; and from about 0.3 wt. % to about 0.7 wt. %, of organic binder, for example, glycerol monostearate.

It may be that the mineral filler is essentially dry. For example, it may be that the mineral filler comprises no greater than about 1.0 wt. % of water, based on the total weight of the mineral filler.

It may be that the mineral filler is a compressed mineral filler. It may be that the mineral filler is a granulated mineral filler. It may be that the mineral filler is a compressed granulated mineral filler. It may be that the compressed granulated mineral filler is a mineral filler in brick, briquette, pellet, pressing, mould, preform, spray-dried powder, tablet, aggregate, rod, granulate or agglomerate form, or any mixture thereof.

The compressed granulated mineral filler may have a tapped density in accordance with ISO 787/11 of no greater than about 2.0 g/cm$^3$, for example, no greater than about 1.8 g/cm$^3$, or no greater than about 1.6 g/cm$^3$, or no greater than about 1.4 g/cm$^3$, or no greater than about 1.2 g/cm$^3$. The compressed granulated mineral filler may have a tapped density in accordance with ISO 787/11 of no less than about 0.4 g/cm$^3$, or no less than about 0.6 g/cm$^3$, or no less than about 0.8 g/cm$^3$. The compressed granulated mineral filler may have a tapped density in accordance with ISO 787/11 of from about 0.4 g/cm$^3$ to about 2.0 g/cm$^3$, for example from about 0.6 g/cm$^3$ to about 1.6 g/cm$^3$, or from about 0.6 g/cm$^3$ to about 1.4 g/cm$^3$, or from about 0.8 g/cm$^3$ to about 1.2 g/cm$^3$.

The compressed granulated mineral filler may be produced by compounding the organic binder, talc and wollastonite, and optionally water, in a mixing tank, followed by pelletising the obtained mixture. The method of granulating the mixture may comprise adding up to 40 wt. % of water. The mixture may be granulated in a Kahl press. Standard pelletising techniques known to the skilled person in the art may be employed. The method may comprise drying the mixture, either prior to or after pelletisation, by heating. The method may comprise heating the organic binder prior to admixing with water and the talc and wollastonite. The method may comprise adding the organic binder to heated water before admixing with the talc and wollastonite. It may be that the organic binder is pre-mixed with water prior to mixing with the talc and wollastonite, optionally wherein a surface agent is added to the mixture of organic binder and water.

Polymer Composition

The polymer composition typically comprises one or more polymers. The polymer composition may comprise one or more polyolefins (e.g. one or more polyalkenes). The polymer composition may comprise one or more thermoplastic polyolefins. The polymer composition may comprise polyethylene. The polymer composition may comprise polypropylene. The polymer composition may comprise one or more polyamides, for example, PA6, PA66, PA11, PA12 and/or PA46. The polymer composition may comprise one or more polyesters or one or more polyester-based blends, for example, polycarbonate, polycarbonate-acrylonitrile butadiene styrene (PC/ABS), and/or polycarbonate-polybutylene terephthalate (PC/PBT). The polymer composition may comprise one or more styrenic polymers, for example, acrylonitrile butadiene styrene (ABS) and/or polystyrene. The polymer composition may comprise one or more copolymers. The polymer composition may comprise polypropylene copolymer. The polymer composition may comprise ethylene-octene copolymers. The polymer composition may comprise a polymer blend, for example a compatible polymer blend or a miscible polymer blend. The polymer composition may comprise one or more multiphase copolymers. The polymer composition may comprise one or more polymer alloys. The polymer composition may comprise one or more polycarbonate alloys.

In certain embodiments, the polymer composition comprises one or more thermoplastic polyolefins.

In certain embodiments, the polymer composition comprises polypropylene. In certain embodiments, the polymer composition comprises polypropylene copolymer.

The polymer composition may be made by compounding one or more polymers with the mineral filler. Compounding per se is a technique which is well known to persons skilled in the art of polymer processing and manufacture and consists of preparing plastic formulations by mixing and/or blending polymers and optional additives in a molten state. It is understood in the art that compounding is distinct from blending or mixing processes conducted at temperatures below that at which the constituents become molten. Compounding may, for example, be used to form a masterbatch composition. Compounding may, for example, involve adding a masterbatch composition to a polymer to form a further polymer composition.

The polymer composition may, for example, be extruded. For example, compounding may be carried out using a screw, e.g. a twin screw, compounder, for example, a Baker Perkins 25 mm twin screw compounder. For example, compounding may be carried out using a multi-roll mill, for example a two-roll mill. For example, compounding may be carried out using a co-kneader or internal mixer. The methods disclosed herein may, for example, include compression moulding or injection moulding. The polymer and/or mineral filler and/or optional additives may be premixed and fed from a single hopper.

The resulting melt may, for example, be cooled, for example in a water bath, and then pelletized. The resulting melt may be calendared to form a sheet or film.

The polymer composition may be shaped into a desired form or article. Shaping of the polymer composition may, for example, involve heating the composition to soften it. The polymer composition may, for example, be shaped by molding (e.g. compression molding, injection molding, stretch blow molding, injection blow molding, overmolding), extrusion, casting, or themoforming.

The polymer composition may comprise no greater than about 50 wt. %, for example, no greater than about 40 wt. %, or no greater than about 30 wt. %, or no greater than about 25 wt. %, or no greater than about 20 wt. %, of mineral filler, based on the total weight of the polymer composition. The polymer composition may comprise no less than about 1 wt. %, for example, no less than about 5 wt. %, or no less than about 10 wt. %, or no less than about 15 wt. %, or no less than about 20 wt. %, of mineral filler, based on the total weight of the polymer composition. The polymer composition may comprise from about 1 wt. % to about 50 wt. %, for example, from about 5 wt. % to about 40 wt. %, or from about 5 wt. % to about 30 wt. %, or from about 10 wt. % to about 30 wt. %, or from about 15 wt. % to about 25 wt. %, of mineral filler, based on the total weight of the polymer composition. The polymer composition may comprise about 20 wt. % of mineral filler based on the total weight of the polymer composition.

The polymer composition may comprise no greater than about 50 wt. %, for example, no greater than about 40 wt. %, or no greater than about 30 wt. %, or no greater than about 25 wt. %, or no greater than about 20 wt. %, of talc and wollastonite, based on the total weight of the polymer composition. The polymer composition may comprise no less than about 1 wt. %, for example, no less than about 5 wt. %, or no less than about 10 wt. %, or no less than about 15 wt. %, or no less than about 20 wt. %, of talc and wollastonite, based on the total weight of the polymer composition. The polymer composition may comprise from about 1 wt. % to about 50 wt. %, for example, from about 5 wt. % to about 40 wt. %, or from about 5 wt. % to about 30 wt. %, or from about 10 wt. % to about 30 wt. %, or from about 15 wt. % to about 25 wt. %, of talc and wollastonite, based on the total weight of the polymer composition. The polymer composition may comprise about 20 wt. % of talc and wollastonite based on the total weight of the polymer composition.

The polymer composition may comprise no greater than about 50 wt. %, for example, no greater than about 40 wt. %, or no greater than about 30 wt. %, or no greater than about 25 wt. %, or no greater than about 20 wt. %, of mineral filler, based on the total weight of the polymer composition, wherein the mineral filler comprises talc and wollastonite in a weight ratio of from about 2:1 to about 1:2, for example, about 1:1. The polymer composition may comprise no less than about 1 wt. %, for example, no less than about 5 wt. %, or no less than about 10 wt. %, or no less than about 15 wt. %, or no less than about 20 wt. %, of mineral filler, based on the total weight of the polymer composition, wherein the mineral filler comprises talc and wollastonite in a weight ratio of from about 2:1 to about 1:2, for example, about 1:1. The polymer composition may comprise from about 1 wt. % to about 50 wt. %, for example, from about 5 wt. % to about 40 wt. %, or from about 5 wt. % to about 30 wt. %, or from about 10 wt. % to about 30 wt. %, or from about 15 wt. % to about 25 wt. of mineral filler, based on the total weight of the polymer composition, wherein the mineral filler comprises talc and wollastonite in a weight ratio of from about 2:1 to about 1:2, for example, about 1:1. The polymer composition may comprise about 20 wt. % of mineral filler, based on the total weight of the polymer composition, wherein the mineral filler comprises talc and wollastonite in a weight ratio of from about 2:1 to about 1:2, for example, about 1:1.

The polymer composition may comprise no greater than about 30 wt. %, for example, or no greater than about 25 wt. %, or no greater than about 20 wt. %, no greater than about 15 wt. %, or no greater than about 13 wt. %, or no greater than about 12 wt. %, or no greater than about 11 wt. %, or no greater than about 10 wt. %, of talc, based on the total weight of the polymer composition. The polymer composition may comprise no less than about 1 wt. %, for example, no less than about 5 wt. %, or no less than about 8 wt. %, or no less than about 9 wt. %, or no less than about 10 wt. %, of talc, based on the total weight of the polymer composition. The polymer composition may comprise from about 1 wt. % to about 30 wt. %, for example, from about 1 wt. % to about 25 wt. %, or from about 1 wt. % to about 20 wt. %, or from about 1 wt. % to about 15 wt. %, or from about 5 wt. % to about 20 wt. %, or from about 5 wt. % to about 15 wt. %, or from about 8 wt. % to about 12 wt. %, or from about 9 wt. % to about 11 wt. %, for example, about 10 wt. %, of talc, based on the total weight of the polymer composition.

The polymer composition may comprise no greater than about 30 wt. %, for example, or no greater than about 25 wt. %, or no greater than about 20 wt. %, no greater than about 15 wt. %, or no greater than about 13 wt. %, or no greater than about 12 wt. %, or no greater than about 11 wt. %, or no greater than about 10 wt. %, of wollastonite, based on the total weight of the polymer composition. The polymer composition may comprise no less than about 1 wt. %, for example, no less than about 5 wt. %, or no less than about 8 wt. %, or no less than about 9 wt. %, or no less than about 10 wt. %, of wollastonite, based on the total weight of the polymer composition. The polymer composition may comprise from about 1 wt. % to about 30 wt. %, for example, from about 1 wt. % to about 25 wt. %, or from about 1 wt. % to about 20 wt. %, or from about 1 wt. % to about 15 wt. %, or from about 5 wt. % to about 20 wt. %, or from about 5 wt. % to about 15 wt. %, or from about 8 wt. % to about 12 wt. %, or from about 9 wt. % to about 11 wt. %, for example, about 10 wt. %, of wollastonite, based on the total weight of the polymer composition.

The polymer composition may comprise, based on the total weight of the polymer composition: from about 1 wt. % to about 30 wt. % of talc and from about 1 wt. % to about 30 wt. % of wollastonite, for example, from about 1 wt. % to about 25 wt. % of talc and from about 1 wt. % to about 25 wt. % of wollastonite, or from about 1 wt. % to about 20 wt. % of talc and from about 1 wt. % to about 20 wt. % of wollastonite, or from about 1 wt. % to about 15 wt. % of talc and from about 1 wt. % to about 15 wt. % of wollastonite, or from about 5 wt. % to about 20 wt. % of talc and from about 5 wt. % to about 20 wt. % of wollastonite, or from about 5 wt. % to about 15 wt. % of talc and from about 5 wt. % to about 15 wt. % of wollastonite, or from about 8 wt. % to about 12 wt. % of talc and from about 8 wt. % to about 12 wt. % of wollastonite, or from about 9 wt. % to about 11 wt. % of talc and from about 9 wt. % to about 11 wt. % of wollastonite, for example, about 10 wt. %, of talc and about 10 wt. % of wollastonite, based on the total weight of the polymer composition.

The polymer composition may comprise no greater than about 2.0 wt. %, for example, no greater than about 1.5 wt. %, or no greater than about 1.0 wt. %, or no greater than about 0.5 wt. %, or no greater than about 0.1 wt. %, or no greater than about 0.09 wt. %, of organic binder, based on the total weight of the polymer composition. The polymer composition may comprise no less than about 0.01 wt. %, for example, no less than about 0.05 wt. %, or no less than about 0.1 wt. %, of organic binder, based on the total weight of the polymer composition. The polymer composition may comprise from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder, based on the total weight of the polymer composition.

The polymer composition may comprise, based on the total weight of the polymer composition: from about 1 wt. % to about 30 wt. % of talc and from about 1 wt. % to about 30 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; for example, from about 1 wt. % to about 25 wt. % of talc and from about 1 wt. % to about 25 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or from about 1 wt. % to about 20 wt. % of talc and from about 1 wt. % to about 20 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or from about 1 wt. % to about 15 wt. % of talc and from about 1 wt. % to about 15 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or from about 5 wt. % to about 20 wt. % of talc and from about 5 wt. % to about 20 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or from about 5 wt. % to about 15 wt. % of talc and from about 5 wt. % to about 15 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or from about 8 wt. % to about 12 wt. % of talc and from about 8 wt. % to about 12 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or from about 9 wt. % to about 11 wt. % of talc and from about 9 wt. % to about 11 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; or about 10 wt. %, of talc and about 10 wt. % of wollastonite and from about 0.01 wt. % to about 2.0 wt. %, for example, from about 0.01 wt. % to about 1.5 wt. %, or from about 0.01 wt. % to about 1.0 wt. %, or from about 0.01 wt. % to about 0.5 wt. %, or from about 0.01 wt. % to about 0.1 wt. %, or from about 0.01 wt. % to about 0.09 wt. %, or from about 0.05 wt. % to about 2.0 wt. %, or from about 0.05 wt. % to about 1.0 wt. %, or from about 0.05 wt. % to about 0.1 wt. %, or from about 0.05 wt. % to about 0.09 wt. %, of organic binder; based on the total weight of the polymer composition.

The polymer composition may comprise, based on the total weight of the polymer composition: from about 8 wt. % to about 12 wt. % of talc; from about 8 wt. % to about 12 wt. % of wollastonite; and from about 0.02 wt. % to about 0.18 wt. %, for example, from about 0.06 wt. % to about 0.14 wt. %, of organic binder, for example, glycerol monostearate.

Properties

The polymer composition may have a scratch resistance, $\Delta L^*$, of no greater than about 4.0, for example, or no greater than about 3.5, or no greater than about 3.4, or no greater than about 3.3, or no greater than about 3.2, or no greater than about 3.1, or no greater than about no greater than about 3.0, or no greater than about 2.9, or no greater than about 2.8, or no greater than about 2.7, or no greater than about 2.6, or no greater than about 2.5, or no greater than about 2.4, or no greater than about 2.3, or no greater than about 2.2, or no greater than about 2.1, or no greater than about 2.0, as determined by Erichsen scratch test according to GMW 14688 Method A with a load of 10N. The polymer composition may have a scratch resistance, $\Delta L^*$, of no less than about 0.1, for example, no less than about 0.5, or no less than about 1.0, as determined by Erichsen scratch test according to GMW 14688 Method A with a load of 10N. The polymer composition may have a scratch resistance, $\Delta L^*$, of from about 0.1 to about 4.0, for example, from about 0.1 to about 3.5, or from about 0.1 to about 3.0, or from about 0.1 to about 2.8, or from about 0.1 to about 2.6, or from about 0.1 to about 2.5, or from about 0.1 to about 2.4, or from about 0.1 to about 2.3, or from about 0.1 to about 2.2, or from about 0.1 to about 2.1, or from about 0.1 to about 2.0, or from about 0.5 to about 3.0, from about 0.5 to about 2.8, or from about 0.5 to about 2.6, or from about 0.5 to about 2.5, or from about 0.5 to about 2.4, or from about 0.5 to about 2.3, or from about 0.5 to about 2.2, or from about 0.5 to about 2.1, or from about 0.5 to about 2.0, or from about 1.0 to about 3.0, from about 1.0 to about 2.8, or from about 1.0 to about 2.6, or from about 1.0 to about 2.5, or from about 1.0 to about 2.4, or from about 1.0 to about 2.3, or from about 1.0 to about 2.2, or from about 1.0 to about 2.1, or from about 1.0 to about 2.0, as determined by Erichsen scratch test according to GMW 14688 Method A with a load of 10N.

The polymer composition may have a scratch resistance, $\Delta L^*$, of no greater than about 3.0, for example, no greater than about 2.9, or no greater than about 2.8, or no greater than about 2.7, or no greater than about 2.6, or no greater than about 2.5, or no greater than about 2.4, or no greater than about 2.3, or no greater than about 2.2, or no greater than about 2.1, or no greater than about 2.0, as determined by Erichsen scratch test, according to GMW 14688 Method A with a load of 10N, on a standard plaque sample of the polymer composition. The polymer composition may have a scratch resistance, $\Delta L^*$, of no less than about 0.1, for example, no less than about 0.5, or no less than about 1.0, as determined by Erichsen scratch test, according to GMW 14688 Method A with a load of 10N, on a standard plaque sample of the polymer composition. The polymer composition may have a scratch resistance, $\Delta L^*$, of from about 0.1 to about 3.0, for example, from about 0.1 to about 2.8, or from about 0.1 to about 2.6, or from about 0.1 to about 2.5, or from about 0.1 to about 2.4, or from about 0.1 to about 2.3, or from about 0.1 to about 2.2, or from about 0.1 to about 2.1, or from about 0.1 to about 2.0, or from about 0.5 to about 3.0, from about 0.5 to about 2.8, or from about 0.5 to about 2.6, or from about 0.5 to about 2.5, or from about 0.5 to about 2.4, or from about 0.5 to about 2.3, or from about 0.5 to about 2.2, or from about 0.5 to about 2.1, or from about 0.5 to about 2.0, or from about 1.0 to about 3.0, from about 1.0 to about 2.8, or from about 1.0 to about 2.6, or from about 1.0 to about 2.5, or from about 1.0 to about 2.4, or from about 1.0 to about 2.3, or from about 1.0 to about 2.2, or from about 1.0 to about 2.1, or from about 1.0 to about 2.0, as determined by Erichsen scratch test, according to GMW 14688 Method A with a load of 10N, on a standard (i.e. smooth or non-grained) plaque sample of the polymer composition.

The polymer composition may have a scratch resistance, $\Delta L^*$, of no greater than about 4.0, for example, or no greater than about 3.5, or no greater than about 3.4, or no greater than about 3.3, or no greater than about 3.2, or no greater than about 3.1, or no greater than about no greater than about 3.0, or no greater than about 2.9, or no greater than about 2.8, or no greater than about 2.7, or no greater than about 2.6, or no greater than about 2.5, or no greater than about 2.4, or no greater than about 2.3, or no greater than about 2.2, or no greater than about 2.1, or no greater than about 2.0, as determined by Erichsen scratch test, according to GMW 14688 Method A with a load of 10N, on a grained plaque sample of the polymer composition. The polymer composition may have a scratch resistance, ΔL*, of no less than about 0.1, for example, no less than about 0.5, or no less than about 1.0, as determined by Erichsen scratch test, according to GMW 14688 Method A with a load of 10N, on a grained plaque sample of the polymer composition. The polymer composition may have a scratch resistance, ΔL*, of from about 0.1 to about 4.0, for example, from about 0.1 to about 3.5, or from about 0.1 to about 3.0, or from about 0.1 to about 2.8, or from about 0.1 to about 2.6, or from about 0.1 to about 2.5, or from about 0.1 to about 2.4, or from about 0.1 to about 2.3, or from about 0.1 to about 2.2, or from about 0.1 to about 2.1, or from about 0.1 to about 2.0, or from about 0.5 to about 3.0, from about 0.5 to about 2.8, or from about 0.5 to about 2.6, or from about 0.5 to about 2.5, or from about 0.5 to about 2.4, or from about 0.5 to about 2.3, or from about 0.5 to about 2.2, or from about 0.5 to about 2.1, or from about 0.5 to about 2.0, or from about 1.0 to about 3.0, from about 1.0 to about 2.8, or from about 1.0 to about 2.6, or from about 1.0 to about 2.5, or from about 1.0 to about 2.4, or from about 1.0 to about 2.3, or from about 1.0 to about 2.2, or from about 1.0 to about 2.1, or from about 1.0 to about 2.0, as determined by Erichsen scratch test, according to GMW 14688 Method A with a load of 10N, on a grained plaque sample of the polymer composition. The grained plaque sample may be finely grained (e.g. PSA P100) or coarsely grained (e.g. VW K59).

In the Erichsen scratch test, a cross-hatched pattern is scratched onto the surface of a material sample under a defined mechanical load using an Erichsen scratch tester having a cylindrical hard metal pen with a polished, ball-shaped end of radius (0.5±0.01) mm. The pen is scratched over greater than or equal to 40 mm of the surface at a speed of (1000±50) mm/minute. The brightness or luminance (measured in terms of L* in the CIELAB colour space) of the scratched region, $L^*_S$, is compared to the brightness of an unscratched region, $L^*_U$, to quantify the visibility of the scratched region in terms of scratch resistance parameter ΔL* defined according to:

$$\Delta L^* = L^*_S - L^*_U.$$

Brightness values can be determined using a spectrophotometer fulfilling the requirements of ISO 7724, for example, a Konica Minolta CM-3700d spectrophotometer with D65 illuminant and color space CIE LAB (1976). Scratches are more visible in materials having higher values of ΔL* and consequently such materials are described as being less scratch resistant.

The thermal expansion coefficient anisotropy of an injection-moulded material is the difference between the parallel thermal expansion coefficient (i.e. the linear thermal expansion coefficient measured parallel to the direction of plastic flow during the injection moulding process) and the perpendicular thermal expansion coefficient (i.e. the linear thermal expansion coefficient measured perpendicular to the direction of plastic flow during the injection moulding process) measured for an injection-moulded sample of the material. It may be that the thermal expansion coefficient anisotropy of the polymer composition (i.e. of an injection-moulded sample of the polymer composition) is no greater than about $10 \times 10^{-6}$ $C^{-1}$, for example, no greater than about $9 \times 10^{-6}$ $C^{-1}$, or no greater than about $8 \times 10^{-6}$ $C^{-1}$, or no greater than about $7 \times 10^{-6}$ $C^{-1}$, or no greater than about $6 \times 10^{-6}$ $C^{-1}$, or no greater than about $5 \times 10^{-6}$ $C^{-1}$, or no greater than about $4 \times 10^{-6}$ $C^{-1}$, or no greater than about $3 \times 10^{-6}$ $C^{-1}$, or no greater than about $2 \times 10^{-6}$ $C^{-1}$, or no greater than about $1 \times 10^{-6}$ $C^{-1}$. It may be that the thermal expansion coefficient anisotropy of the polymer composition (i.e. of an injection-moulded sample of the polymer composition) is no less than about $0.1 \times 10^{-6}$ $C^{-1}$, for example, no less than about $1 \times 10^{-6}$ $C^{-1}$. It may be that the thermal expansion coefficient anisotropy of the polymer composition (i.e. of an injection-moulded sample of the polymer composition) is from about $0.1 \times 10^{-6}$ $C^{-1}$ to about $10 \times 10^{-6}$ $C^{-1}$, for example, from about $0.1 \times 10^{-6}$ $C^{-1}$ to about $9 \times 10^{-6}$ $C^{-1}$, or from about $0.1 \times 10^{-6}$ $C^{-1}$ to about $8 \times 10^{-6}$ $C^{-1}$, or from about $0.1 \times 10^{-6}$ $C^{-1}$ to about $7 \times 10^{-6}$ $C^{-1}$, or from about $0.1 \times 10^{-6}$ $C^{-1}$ to about $6 \times 10^{-6}$ $C^{-1}$, or from about $0.1 \times 10^{-6}$ $C^{-1}$ to about $5 \times 10^{-6}$ $C^{-1}$, or from about $0.1 \times 10^{-6}$ $C^{-1}$ to about $4 \times 10^{-6}$ $C^{-1}$, or from about $0.1 \times 10^{-6}$ $C^{-1}$ to about $3 \times 10^{-6}$ $C^{-1}$, or from about $0.1 \times 10^{-6}$ $C^{-1}$ to about $2 \times 10^{-6}$ $C^{-1}$, or from about $0.1 \times 10^{-6}$ $C^{-1}$ to about $1 \times 10^{-6}$ $C^{-1}$, from about $1 \times 10^{-6}$ $C^{-1}$ to about $10 \times 10^{-6}$ $C^{-1}$, or from about $1 \times 10^{-6}$ $C^{-1}$ to about $9 \times 10^{-6}$ $C^{-1}$, or from about $1 \times 10^{-6}$ $C^{-1}$ to about $8 \times 10^{-6}$ $C^{-1}$, or from about $1 \times 10^{-6}$ $C^{-1}$ to about $7 \times 10^{-6}$ $C^{-1}$, or from about $1 \times 10^{-6}$ $C^{-1}$ to about $6 \times 10^{-6}$ $C^{-1}$, or from about $1 \times 10^{-6}$ $C^{-1}$ to about $5 \times 10^{-6}$ $C^{-1}$, or from about $1 \times 10^{-6}$ $C^{-1}$ to about $4 \times 10^{-6}$ $C^{-1}$, or from about $1 \times 10^{-6}$ $C^{-1}$ to about $3 \times 10^{-6}$ $C^{-1}$, or from about $1 \times 10^{-6}$ $C^{-1}$ to about $2 \times 10^{-6}$ $C^{-1}$.

The thermal expansion coefficient anisotropy of an injection-moulded sample of material can be determined by measuring the expansion of the sample along two axes, parallel and perpendicular to the plastic flow direction during injection moulding, as the sample is heated from an initial starting temperature of 23° C. using two strain gauges and a temperature sensor connected to a data logger. A sample plaque of material measuring 50 mm by 50 mm may be used. The sample may be heated at a heating rate of between 1° C./minute and 2° C./minute from the starting temperature of 23° C. to a finishing temperature of 70° C. The linear thermal expansion coefficient, a, may be determined in each of the parallel and perpendicular directions according to:

$$\alpha = \frac{1}{L}\frac{dL}{dT}$$

where L is the initial length of the sample in the respective parallel or perpendicular direction and dL/dT is the rate of change of the length of the sample in the said direction with respect to the change in temperature. The thermal expansion coefficient anisotropy may be determined as the difference between the linear thermal expansion coefficients measured in the parallel and perpendicular directions.

Prior to measurement of the thermal expansion coefficient anisotropy, the sample may be annealed at 80° C. for at least 4 hours before cooling to room temperature. Annealing should be carried out at least 48 hours after injection moulding of the sample.

The polymer composition may have a flexural modulus of no greater than about 2.70 GPa, for example, no greater than about 2.65 GPa, or no greater than about 2.60 GPa, or no greater than about 2.55 GPa, or no greater than about 2.50 GPa. The polymer composition may have a flexural modulus of no less than about 2.00 GPa, for example, no less than about 2.20 GPa, or no less than about 2.40 GPa. The polymer composition may have a flexural modulus of from about 2.00 GPa to about 2.70 GPa, for example, from about 2.00 GPa to about 2.65 GPa, or from about 2.00 GPa to about 2.60 GPa, or from about 2.00 GPa to about 2.55 GPa, or from about 2.00 GPa to about 2.50 GPa, or from about 2.20 GPa to about 2.70 GPa, or from about 2.20 GPa to about 2.60 GPa, or from about 2.20 GPa to about 2.50 GPa, or from about 2.40 GPa to about 2.70 GPa, or from about 2.40 GPa to about 2.60 GPa, or from about 2.40 GPa to about 2.50 GPa.

The term "flexural modulus" refers to the elastic modulus of a material when measured during flexural deformation or bending. The flexural modulus for a material is determined as the ratio of stress to strain measured during a flexural test (according to, for example, ISO 178) of a sample of the material, when measured at relatively low strains such that Hooke's law applies (i.e. in the linear region of a stress-strain plot).

The polymer composition may have an impact resistance (also referred to as "impact energy" or "impact strength"), as measured by Charpy impact test according to ISO 179-1/1fU at a temperature of −20° C., of no greater than about 50 kJ/m$^2$, for example, no greater than about 45 kJ/m$^2$, or no greater than about 40 kJ/m$^2$, or no greater than about 35 kJ/m$^2$. The polymer composition may have an impact resistance, as measured by Charpy impact test according to ISO 179-1/1fU at a temperature of −20° C., of no less than about 25 kJ/m$^2$, for example, no greater than about 30 kJ/m$^2$. The polymer composition may have an impact resistance, as measured by Charpy impact test according to ISO 179-1/1fU at a temperature of −20° C., of from about 25 kJ/m$^2$ to about 50 kJ/m$^2$, for example, from about 25 kJ/m$^2$ to about 45 kJ/m$^2$, or from about 25 kJ/m$^2$ to about 40 kJ/m$^2$, or from about 25 kJ/m$^2$ to about 35 kJ/m$^2$, or from about 30 kJ/m$^2$ to about 50 kJ/m$^2$, or from about 30 kJ/m$^2$ to about 45 kJ/m$^2$, or from about 30 kJ/m$^2$ to about 40 kJ/m$^2$, or from about 30 kJ/m$^2$ to about 35 kJ/m$^2$.

It may be that the polymer composition comprises, based on the total weight of the polymer composition, from about 8 wt. % to about 12 wt. % of talc and from about 8 wt. % to about 12 wt. % of wollastonite, and that the polymer composition has a scratch resistance, ΔL*, of from about 0.1 to about 4.0, for example, from about 0.1 to about 3.5, or from about 0.1 to about 3.0, or from about 0.1 to about 2.6, or from about 0.1 to about 2.5, or from about 0.1 to about 2.4, or from about 0.1 to about 2.3, or from about 0.1 to about 2.2, or from about 0.1 to about 2.1, or from about 0.1 to about 2.0, or from about 0.5 to about 3.0, from about 0.5 to about 2.8, or from about 0.5 to about 2.6, or from about 0.5 to about 2.5, or from about 0.5 to about 2.4, or from about 0.5 to about 2.3, or from about 0.5 to about 2.2, or from about 0.5 to about 2.1, or from about 0.5 to about 2.0, or from about 1.0 to about 3.0, from about 1.0 to about 2.8, or from about 1.0 to about 2.6, or from about 1.0 to about 2.5, or from about 1.0 to about 2.4, or from about 1.0 to about 2.3, or from about 1.0 to about 2.2, or from about 1.0 to about 2.1, or from about 1.0 to about 2.0.

It may be that the polymer composition comprises, based on the total weight of the polymer composition, from about 8 wt. % to about 12 wt. % of talc and from about 8 wt. % to about 12 wt. % of wollastonite, and that the polymer composition (i.e. of an injection-moulded sample of the polymer composition) has a thermal expansion coefficient anisotropy of from about 0.1×10$^{-6}$ C$^{-1}$ to about 10×10$^{-6}$ C$^{-1}$, for example, from about 0.1×10$^{-6}$ C$^{-1}$ to about 9×10$^{-6}$ C$^{-1}$, or from about 0.1×10$^{-6}$ C$^{-1}$ to about 8×10$^{-6}$ C$^{-1}$, or from about 0.1×10$^{-6}$ C$^{-1}$ to about 7×10$^{-6}$ C$^{-1}$, or from about 0.1×10$^{-6}$ C$^{-1}$ to about 6×10$^{-6}$ C$^{-1}$, or from about 0.1×10$^{-6}$ C$^{-1}$ to about 5×10$^{-6}$ C$^{-1}$, or from about 0.1×10$^{-6}$ C$^{-1}$ to about 4×10$^{-6}$ C$^{-1}$, or from about 0.1×10$^{-6}$ C$^{-1}$ to about 3×10$^{-6}$ C$^{-1}$, or from about 0.1×10$^{-6}$ C$^{-1}$ to about 2×10$^{-6}$ C$^{-1}$, or from about 0.1×10$^{-6}$ C$^{-1}$ to about 1×10$^{-6}$ C$^{-1}$, from about 1×10$^{-6}$ C$^{-1}$ to about 10×10$^{-6}$ C$^{-1}$, or from about 1×10$^{-6}$ C$^{-1}$ to about 9×10$^{-6}$ C$^{-1}$, or from about 1×10$^{-6}$ C$^{-1}$ to about 8×10$^{-6}$ C$^{-1}$, or from about 1×10$^{-6}$ C$^{-1}$ to about 7×10$^{-6}$ C$^{-1}$, or from about 1×10$^{-6}$ C$^{-1}$ to about 6×10$^{-6}$ C$^{-1}$, or from about 1×10$^{-6}$ C$^{-1}$ to about 5×10$^{-6}$ C$^{-1}$, or from about 1×10$^{-6}$ C$^{-1}$ to about 4×10$^{-6}$ C$^{-1}$, or from about 1×10$^{-6}$ C$^{-1}$ to about 3×10$^{-6}$ C$^{-1}$, or from about 1×10$^{-6}$ C$^{-1}$ to about 2×10$^{-6}$ C$^{-1}$.

It may be that the polymer composition comprises, based on the total weight of the polymer composition, from about 8 wt. % to about 12 wt. % of talc and from about 8 wt. % to about 12 wt. % of wollastonite, and that the polymer composition has a flexural modulus of from about 2.00 GPa to about 2.70 GPa, for example, from about 2.00 GPa to about 2.65 GPa, or from about 2.00 GPa to about 2.60 GPa, or from about 2.00 GPa to about 2.55 GPa, or from about 2.00 GPa to about 2.50 GPa, or from about 2.20 GPa to about 2.70 GPa, or from about 2.20 GPa to about 2.60 GPa, or from about 2.20 GPa to about 2.50 GPa, or from about 2.40 GPa to about 2.70 GPa, or from about 2.40 GPa to about 2.60 GPa, or from about 2.40 GPa to about 2.50 GPa.

It may be that the polymer composition comprises, based on the total weight of the polymer composition, from about 8 wt. % to about 12 wt. % of talc and from about 8 wt. % to about 12 wt. % of wollastonite, and that the polymer composition has an impact resistance, as measured by Charpy impact test at a temperature of −22° C., of from about 25 kJ/m$^2$ to about 50 kJ/m$^2$, for example, from about 25 kJ/m$^2$ to about 45 kJ/m$^2$, or from about 25 kJ/m$^2$ to about 40 kJ/m$^2$, or from about 25 kJ/m$^2$ to about 35 kJ/m$^2$, or from about 30 kJ/m$^2$ to about 50 kJ/m$^2$, or from about 30 kJ/m$^2$ to about 45 kJ/m$^2$, or from about 30 kJ/m$^2$ to about 40 kJ/m$^2$, or from about 30 kJ/m$^2$ to about 35 kJ/m$^2$.

It may be that the polymer composition comprises, based on the total weight of the polymer composition, from about 8 wt. % to about 12 wt. % of talc and from about 8 wt. % to about 12 wt. % of wollastonite and from about 0.02 wt. % to about 2.0 wt. %, for example, from about 0.02 wt. % to about 1.0 wt. %, or from about 0.02 wt. % to about 0.18 wt. %, or from about 0.06 wt. % to about 0.14 wt. %, of organic binder, for example, glycerol monostearate, and that the polymer composition has a scratch resistance, ΔL*, of from about 0.1 to about 4.0, for example, from about 0.1 to about 3.5, or from about 0.1 to about 3.0, or from about 0.1 to about 2.8, or from about 0.1 to about 2.6, or from about 0.1 to about 2.5, or from about 0.1 to about 2.4, or from about 0.1 to about 2.3, or from about 0.1 to about 2.2, or from about 0.1 to about 2.1, or from about 0.1 to about 2.0, or from about 0.5 to about 3.0, from about 0.5 to about 2.8, or from about 0.5 to about 2.6, or from about 0.5 to about 2.5, or from about 0.5 to about 2.4, or from about 0.5 to about 2.3, or from about 0.5 to about 2.2, or from about 0.5 to about 2.1, or from about 0.5 to about 2.0, or from about 1.0 to about 3.0, from about 1.0 to about 2.8, or from about 1.0 to about 2.6, or from about 1.0 to about 2.5, or from about 1.0 to about 2.4, or from about 1.0 to about 2.3, or from about 1.0 to about 2.2, or from about 1.0 to about 2.1, or from about 1.0 to about 2.0.

It may be that the polymer composition comprises, based on the total weight of the polymer composition, from about 8 wt. % to about 12 wt. % of talc and from about 8 wt. % to about 12 wt. % of wollastonite and from about 0.02 wt. % to about 2.0 wt. %, for example, from about 0.02 wt. % to about 1.0 wt. %, or from about 0.02 wt. % to about 0.18 wt. %, or from about 0.06 wt. % to about 0.14 wt. %, of organic binder, for example, glycerol monostearate, and that the polymer composition (i.e. of an injection-moulded sample of the polymer composition) has a thermal expansion coefficient anisotropy of from about $0.1 \times 10^{-6}$ $C^{-1}$ to about $10 \times 10^{-6}$ $C^{-1}$, for example, from about $0.1 \times 10^{-6}$ $C^{-1}$ to about $9 \times 10^{-6}$ $C^{-1}$, or from about $0.1 \times 10^{-6}$ $C^{-1}$ to about $8 \times 10^{-6}$ $C^{-1}$, or from about $0.1 \times 10^{-6}$ $C^{-1}$ to about $7 \times 10^{-6}$ $C^{-1}$, or from about $0.1 \times 10^{-6}$ $C^{-1}$ to about $6 \times 10^{-6}$ $C^{-1}$, or from about $0.1 \times 10^{-6}$ $C^{-1}$ to about $5 \times 10^{-6}$ $C^{-1}$, or from about $0.1 \times 10^{-6}$ $C^{-1}$ to about $4 \times 10^{-6}$ $C^{-1}$, or from about $0.1 \times 10^{-6}$ $C^{-1}$ to about $3 \times 10^{-6}$ $C^{-1}$, or from about $0.1 \times 10^{-6}$ $C^{-1}$ to about $2 \times 10^{-6}$ $C^{-1}$, or from about $0.1 \times 10^{-6}$ $C^{-1}$ to about $1 \times 10^{-6}$ $C^{-1}$, from about $1 \times 10^{-6}$ $C^{-1}$ to about $10 \times 10^{-6}$ $C^{-1}$, or from about $1 \times 10^{-6}$ $C^{-1}$ to about $9 \times 10^{-6}$ $C^{-1}$, or from about $1 \times 10^{-6}$ $C^{-1}$ to about $8 \times 10^{-6}$ $C^{-1}$, or from about $1 \times 10^{-6}$ $C^{-1}$ to about $7 \times 10^{-6}$ $C^{-1}$, or from about $1 \times 10^{-6}$ $C^{-1}$ to about $6 \times 10^{-6}$ $C^{-1}$, or from about $1 \times 10^{-6}$ $C^{-1}$ to about $5 \times 10^{-6}$ $C^{-1}$, or from about $1 \times 10^{-6}$ $C^{-1}$ to about $4 \times 10^{-6}$ $C^{-1}$, or from about $1 \times 10^{-6}$ $C^{-1}$ to about $3 \times 10^{-6}$ $C^{-1}$, or from about $1 \times 10^{-6}$ $C^{-1}$ to about $2 \times 10^{-6}$ $C^{-1}$.

It may be that the polymer composition comprises, based on the total weight of the polymer composition, from about 8 wt. % to about 12 wt. % of talc and from about 8 wt. % to about 12 wt. % of wollastonite and from about 0.02 wt. % to about 2.0 wt. %, for example, from about 0.02 wt. % to about 1.0 wt. %, or from about 0.02 wt. % to about 0.18 wt. %, or from about 0.06 wt. % to about 0.14 wt. %, of organic binder, for example, glycerol monostearate, and that the polymer composition has a flexural modulus of from about 2.00 GPa to about 2.70 GPa, for example, from about 2.00 GPa to about 2.65 GPa, or from about 2.00 GPa to about 2.60 GPa, or from about 2.00 GPa to about 2.55 GPa, or from about 2.00 GPa to about 2.50 GPa, or from about 2.20 GPa to about 2.70 GPa, or from about 2.20 GPa to about 2.60 GPa, or from about 2.20 GPa to about 2.50 GPa, or from about 2.40 GPa to about 2.70 GPa, or from about 2.40 GPa to about 2.60 GPa, or from about 2.40 GPa to about 2.50 GPa.

It may be that the polymer composition comprises, based on the total weight of the polymer composition, from about 8 wt. % to about 12 wt. % of talc and from about 8 wt. % to about 12 wt. % of wollastonite and from about 0.02 wt. % to about 2.0 wt. %, for example, from about 0.02 wt. % to about 1.0 wt. %, or from about 0.02 wt. % to about 0.18 wt. %, or from about 0.06 wt. % to about 0.14 wt. %, of organic binder, for example, glycerol monostearate, and that the polymer composition has an impact resistance, as measured by Charpy impact test according to ISO 179-1/1fU at a temperature of −20° C., of from about 25 kJ/m² to about 50 kJ/m², for example, from about 25 kJ/m² to about 45 kJ/m², or from about 25 kJ/m² to about 40 kJ/m², or from about 25 kJ/m² to about 35 kJ/m², or from about 30 kJ/m² to about 50 kJ/m², or from about 30 kJ/m² to about 45 kJ/m², or from about 30 kJ/m² to about 40 kJ/m², or from about 30 kJ/m² to about 35 kJ/m².

It may be that the polymer composition comprises, based on the total weight of the polymer composition, from about 8 wt. % to about 12 wt. % of talc and from about 8 wt. % to about 12 wt. % of wollastonite and from about 0.02 wt. % to about 2.0 wt. %, for example, from about 0.02 wt. % to about 1.0 wt. %, or from about 0.02 wt. % to about 0.18 wt. %, or from about 0.06 wt. % to about 0.14 wt. %, of organic binder, for example, glycerol monostearate, and that the polymer composition has a scratch resistance, ΔL*, of from about 0.1 to about 4.0, for example, from about 0.1 to about 3.5, or from about 0.1 to about 3.0, or from about 0.1 to about 2.8, or from about 0.1 to about 2.6, or from about 0.1 to about 2.5, or from about 0.1 to about 2.4, or from about 0.1 to about 2.3, or from about 0.1 to about 2.2, or from about 0.1 to about 2.1, or from about 0.1 to about 2.0, or from about 0.5 to about 3.0, from about 0.5 to about 2.8, or from about 0.5 to about 2.6, or from about 0.5 to about 2.5, or from about 0.5 to about 2.4, or from about 0.5 to about 2.3, or from about 0.5 to about 2.2, or from about 0.5 to about 2.1, or from about 0.5 to about 2.0, or from about 1.0 to about 3.0, from about 1.0 to about 2.8, or from about 1.0 to about 2.6, or from about 1.0 to about 2.5, or from about 1.0 to about 2.4, or from about 1.0 to about 2.3, or from about 1.0 to about 2.2, or from about 1.0 to about 2.1, or from about 1.0 to about 2.0, and a thermal expansion coefficient anisotropy of from about $0.1 \times 10^{-6}$ $C^{-1}$ to about $10 \times 10^{-6}$ $C^{-1}$, for example, from about $0.1 \times 10^{-6}$ $C^{-1}$ to about $9 \times 10^{-6}$ $C^{-1}$, or from about $0.1 \times 10^{-6}$ $C^{-1}$ to about $8 \times 10^{-6}$ $C^{-1}$, or from about $0.1 \times 10^{-6}$ $C^{-1}$ to about $7 \times 10^{-6}$ $C^{-1}$, or from about $0.1 \times 10^{-6}$ $C^{-1}$ to about $6 \times 10^{-6}$ $C^{-1}$, or from about $0.1 \times 10^{-6}$ $C^{-1}$ to about $5 \times 10^{-6}$ $C^{-1}$, or from about $0.1 \times 10^{-6}$ $C^{-1}$ to about $4 \times 10^{-6}$ $C^{-1}$, or from about $0.1 \times 10^{-6}$ $C^{-1}$ to about $3 \times 10^{-6}$ $C^{-1}$, or from about $0.1 \times 10^{-6}$ $C^{-1}$ to about $2 \times 10^{-6}$ $C^{-1}$, or from about $0.1 \times 10^{-6}$ $C^{-1}$ to about $1 \times 10^{-6}$ $C^{-1}$, from about $1 \times 10^{-6}$ $C^{-1}$ to about $10 \times 10^{-6}$ $C^{-1}$, or from about $1 \times 10^{-6}$ $C^{-1}$ to about $9 \times 10^{-6}$ $C^{-1}$, or from about $1 \times 10^{-6}$ $C^{-1}$ to about $8 \times 10^{-6}$ $C^{-1}$, or from about $1 \times 10^{-6}$ $C^{-1}$ to about $7 \times 10^{-6}$ $C^{-1}$, or from about $1 \times 10^{-6}$ $C^{-1}$ to about $6 \times 10^{-6}$ $C^{-1}$, or from about $1 \times 10^{-6}$ $C^{-1}$ to about $5 \times 10^{-6}$ $C^{-1}$, or from about $1 \times 10^{-6}$ $C^{-1}$ to about $4 \times 10^{-6}$ $C^{-1}$, or from about $1 \times 10^{-6}$ $C^{-1}$ to about $3 \times 10^{-6}$ $C^{-1}$, or from about $1 \times 10^{-6}$ $C^{-1}$ to about $2 \times 10^{-6}$ $C^{-1}$.

It may be that addition of talc to a wollastonite-containing mineral filler (e.g. a talc-free, wollastonite-containing mineral filler) increases the rate at which the mineral filler can be incorporated into a polymer composition, for example, on extrusion of the polymer composition with the mineral filler, relative to the rate at which the wollastonite-containing mineral filler (e.g. the talc-free, wollastonite-containing mineral filler prior to the addition of talc) can be incorporated into the polymer composition, by no less than about 25%, for example, no less than about 50%, or no less than about 75%, or no less than about 100%, or no less than about 125%, or no less than about 140%. It may be that addition of talc to a wollastonite-containing mineral filler (e.g. a talc-free, wollastonite-containing mineral filler) increases the rate at which the mineral filler can be incorporated into a polymer composition, for example, on extrusion of the polymer composition with the mineral filler, relative to the rate at which the wollastonite-containing mineral filler (e.g. the talc-free, wollastonite-containing mineral filler prior to the addition of talc) can be incorporated into the polymer composition, by no greater than about 300%, for example, no greater than about 250%, or no greater than about 200%, or no greater than about 175%, or no greater than about 160%. It may be that addition of talc to a wollastonite-containing mineral filler (e.g. a talc-free, wollastonite-containing mineral filler) increases the rate at which the mineral filler can be incorporated into a polymer composition, for example, on extrusion of the polymer composition with the mineral filler, relative to the rate at which the wollastonite-containing mineral filler (e.g. the talc-free, wollastonite-containing mineral filler prior to the addition of talc) can be incorporated into the polymer composition, by from about 25% to about 300%, or from about 50% to about 300%, or from about 75% to about 300%, or from about 100% to about 300%, or from about 125% to about 300%, or from about 140% to about 300%, or from about 140% to about 200%, or from about 140% to about 175%, or from about 140% to about 160%. The rate at which mineral filler is incorporated into the polymer composition is typically measured as the mass of mineral filler which can successfully be incorporated per unit time, e.g., in units of kg/hour.

Articles of Manufacture

An article of manufacture may comprise, for example, be formed from, the polymer composition comprising the mineral filler comprising talc and wollastonite. The article of manufacture may be an automotive component, for example, an interior automotive component or an exterior automotive component, such as a grille, spoiler, or lift gate. The article of manufacture may be an electronic component.

For the avoidance of doubt, the present application is directed to the subject-matter described in the following numbered paragraphs:

1. Use of a mineral filler comprising talc and wollastonite in a polymer composition to improve the scratch resistance and/or reduce the thermal expansion coefficient anisotropy of the polymer composition or an article formed from the polymer composition.
2. A method of improving the scratch resistance and/or reducing the thermal expansion coefficient anisotropy of a polymer composition or an article formed from the polymer composition, wherein the method comprises adding a mineral filler comprising talc and wollastonite to the polymer composition.
3. The use according to numbered paragraph 1 or the method according to numbered paragraph 2, wherein the ratio of the weight of talc to the weight of wollastonite in the mineral filler is from about 1:4 to about 4:1, for example, from about 1:2 to about 2:1.
4. The use or method according to any one preceding numbered paragraph, wherein the mineral filler comprises from about 25.0 wt. % to about 75.0 wt. %, for example, from about 40.0 wt. % to about 60.0 wt. %, of talc, and from about 25.0 wt. % to about 75.0 wt. %, for example, from about 40.0 wt. % to about 60.0 wt. %, of wollastonite, based on the total weight of non-aqueous components in the mineral filler.
5. The use or method according to any one preceding numbered paragraph, wherein the talc has a $d_{50}$ (measured by sedigraph) of from about 0.1 μm to about 5.0 μm, for example, from about 0.5 μm to about 2.0 μm.
6. The use or method according to any one preceding numbered paragraph, wherein the wollastonite has a $d_{50}$ (measured by laser scattering) of from about 1.0 μm to about 15.0 μm, for example, from about 3.0 μm to about 10.0 μm.
7. The use or method according to any one preceding numbered paragraph, wherein the talc has a platy particle morphology.
8. The use or method according to any one preceding numbered paragraph, wherein the wollastonite has a needle-shaped particle morphology and, optionally, wherein the wollastonite has an average particle diameter of from about 1.0 μm to about 15.0 μm, for example, from about 3.0 μm to about 10.0 μm, and an average particle length of from about 20.0 μm to about 100.0 μm, for example, from about 40.0 μm to about 80.0 μm.
9. The use or method according to any one preceding numbered paragraph, wherein the mineral filler comprises an organic binder, for example, an organic binder selected from: stearic acid or its salts, paraffin, glycerol monostearate, polyethylene glycol, ethylene-vinyl acetate, a blend of fatty ester copolymers with acidic groups, polyoxyethylene stearate, propylene glycol monostearate, alkyl or ester modified siloxane, alkane sulfonate, or mixtures thereof.
10. The use or method according to numbered paragraph 9, wherein the mineral filler comprises from about 0.1 wt. % to about 5.0 wt. % of organic binder, based on the total weight of non-aqueous components in the mineral filler.
11. The use or method according to any one preceding numbered paragraph, wherein the mineral filler is a compressed granulated mineral filler, for example, a mineral filler in brick, briquette, pellet, pressing, mould, preform, spray-dried powder, tablet, aggregate, rod, granulate or agglomerate form, or any mixture thereof.
12. The use or method according to numbered paragraph 11, wherein the compressed granulated mineral filler has a tapped density in accordance with ISO 787/11 of from about 0.4 g/cm$^3$ to about 1.4 g/cm$^3$.
13. The use or method according to any one preceding numbered paragraph, wherein the mineral filler is essentially dry, for example, wherein the mineral filler comprises no greater than 1.0 wt. % of water based on the total weight of the mineral filler.
14. The use or method according to any one preceding numbered paragraph, wherein the polymer composition comprises one or more of the following: polyolefins, for example, polypropylene, thermoplastic polyolefins, or polyethylene; polycarbonate alloys; polyamides.
15. The use or method according to any one preceding numbered paragraph, comprising improving the scratch resistance of the polymer composition, or an article formed from the polymer composition, to a value, ΔL*, of no greater than about 3.1 and/or comprising reducing the thermal expansion coefficient anisotropy of the polymer composition, or an article formed from the polymer composition, to a value no greater than about $10 \times 10^{-6}$ C$^{-1}$.
16. A mineral filler for a polymer composition, the mineral filler comprising, based on the total weight of non-aqueous components in the mineral filler: from about 25.0 wt. % to about 75.0 wt. %, for example, from about 40.0 wt. % to about 60.0 wt. %, of talc; from about 25.0 wt. % to about 75.0 wt. %, for example, from about 40.0 wt. % to about 60.0 wt. %, of wollastonite; and from about 0.1 wt. % to about 10.0 wt. %, for example, from about 0.1 wt. % to about 5.0 wt. %, or from about 0.1 wt. % to about 1.0 wt. %, or from about 0.1 wt. % to about 0.9 wt. %, or from about 0.3 wt. % to about 0.7 wt. %, of organic binder.
17. The mineral filler according to numbered paragraph 16, wherein the organic binder is glycerol monostearate.
18. A polymer composition comprising the mineral filler according to numbered paragraph 16 or numbered paragraph 17, for example, wherein the polymer composition comprises one or more of the following: polyolefins, for example, polypropylene, thermoplastic polyolefins, or polyethylene; polypropylene copolymer; polycarbonate alloys; polyamides.
19. The polymer composition according to numbered paragraph 18, wherein the polymer composition, or an article formed from the polymer composition, has a scratch resistance value, ΔL*, of no greater than about 3.1 and/or a thermal expansion coefficient anisotropy of no greater than about $10 \times 10^{-6}$ C$^{-1}$.
20. An article of manufacture, for example, an automotive or electronic component, comprising, for example, formed from, a polymer composition, wherein the polymer composition comprises a mineral filler comprising talc and wollastonite.
21. Use of talc in a wollastonite-containing mineral filler to improve incorporation of wollastonite into a polymer composition on addition of the wollastonite-containing mineral filler to the polymer composition.
22. A method of improving incorporation of wollastonite into a polymer composition on addition of a wollastonite-containing mineral filler to the polymer composition, the method comprising adding talc to the wollastonite-containing mineral filler.
23. The use according to numbered paragraph 21 or the method according to numbered paragraph 22, wherein addition of the wollastonite-containing mineral filler to the polymer composition comprises extrusion of the polymer composition with the wollastonite-containing mineral filler.
24. Use of talc in a wollastonite-containing mineral blend to improve the compactibility of the wollastonite-containing mineral blend.
25. A method of improving the compactibility of a wollastonite-containing mineral blend, the method comprising adding talc to the wollastonite-containing mineral blend.

EXAMPLES

A number of different compacted and granulated blended mineral fillers were prepared by combining powdered wollastonite and powdered talc in different ratios. The wollastonite had a $d_{50}$ of 7.0 μm (measured by laser) and the talc had a $d_{50}$ of 1.0 μm (measured by sedigraph).

The powdered minerals were mixed in a mixing tank with up to 40 wt. % (on top of the amount of mineral) of heated water pre-mixed with between 0.0 wt. % and 2.0 wt. % (on top of the amount of mineral) of an organic binder selected from glycerol monostearate (GMS) or sodium alkane sulfonate (H). An example of a suitable glycerol monostearate is Atmer™ 1013 available from Croda International Plc. An example of a suitable sodium alkane sulfonate is Hostastat® HS 1 FF available from Clariant International Ltd. The resultant mixtures were granulated in a Kahl press. The granulated mixtures were pelletised and dried in an oven.

Three reference mineral fillers were also prepared: one containing the pure powdered wollastonite in an uncompacted form; one containing the pure powdered talc in an uncompacted form; and one containing the pure powdered talc in a compacted form. The first reference mineral filler was not compacted. Both talc reference mineral fillers were granulated with 40 wt. % of water, pelletised and dried.

A number of different polymer compositions were prepared by extruding, at 20 wt. % loading, polypropylene copolymer separately with each of the blended mineral fillers and the reference mineral fillers in a twin-screw extruder. The extruded polymer compositions were injection moulded into ISO samples for materials testing.

The materials testing results which follow are labelled according to: the ratio of talc to wollastonite present in the mineral blend (for example, 50/50 or 33/66 talc to wollastonite); the wt. % of organic binder where present (for example, glycerol monostearate (GMS) or Hostastat® organic binder (H)); and the wt. % of water added to the mineral blend prior to granulation, pelletisation and drying.

Figure 1:
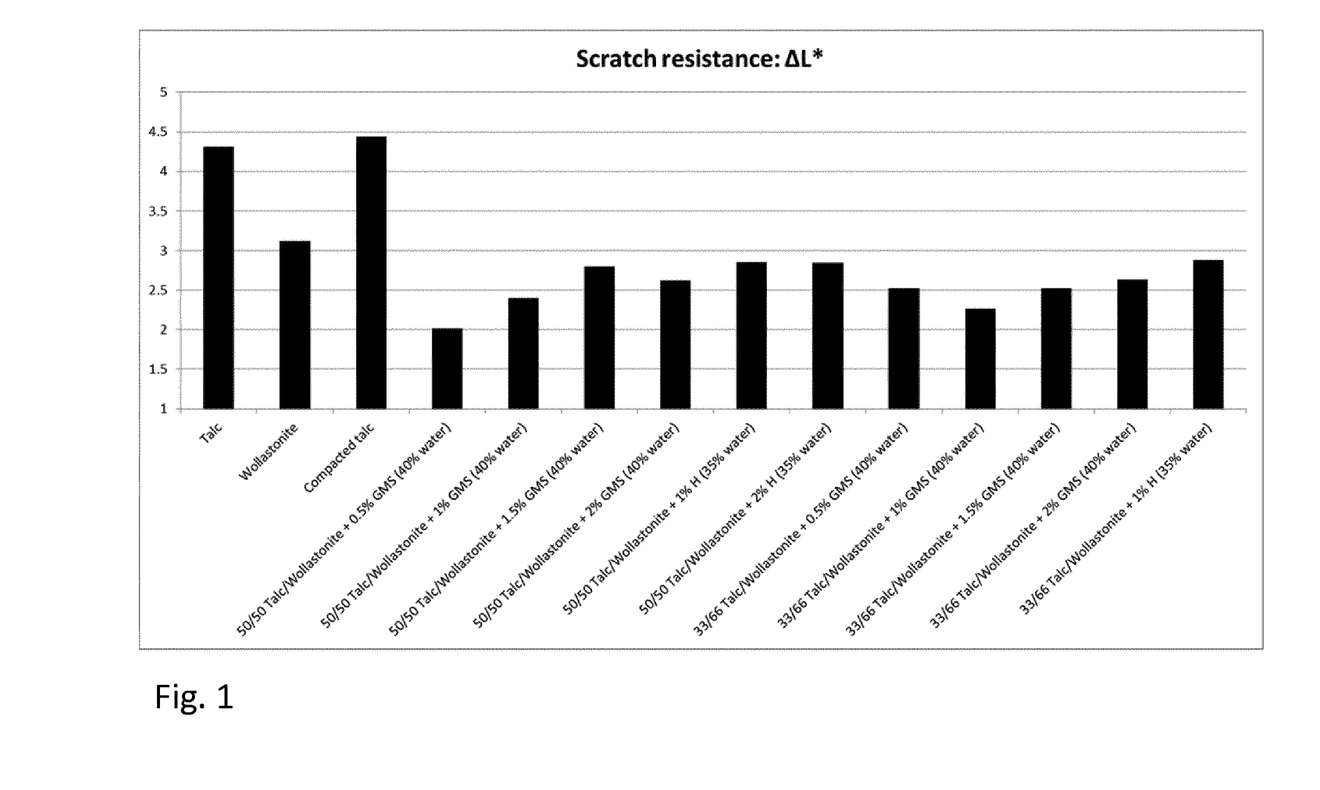
FIG. 1 is a plot summarising the Scratch resistance of a number of compositions described in the Examples.

FIG. 1 shows the scratch resistance, ΔL*, as determined by Erichsen scratch test, according to GMW 14688 Method A with a load of 10N, for standard plaques formed from a number of different polymer compositions. The value of ΔL* for the polymer compositions incorporating mineral blends including both talc and wollastonite were found to be lower than the ΔL* of the pure talc and wollastonite reference compositions. A lower value of ΔL* equates to an improved scratch resistance (i.e. reduced scratch visibility).

Figure 2:
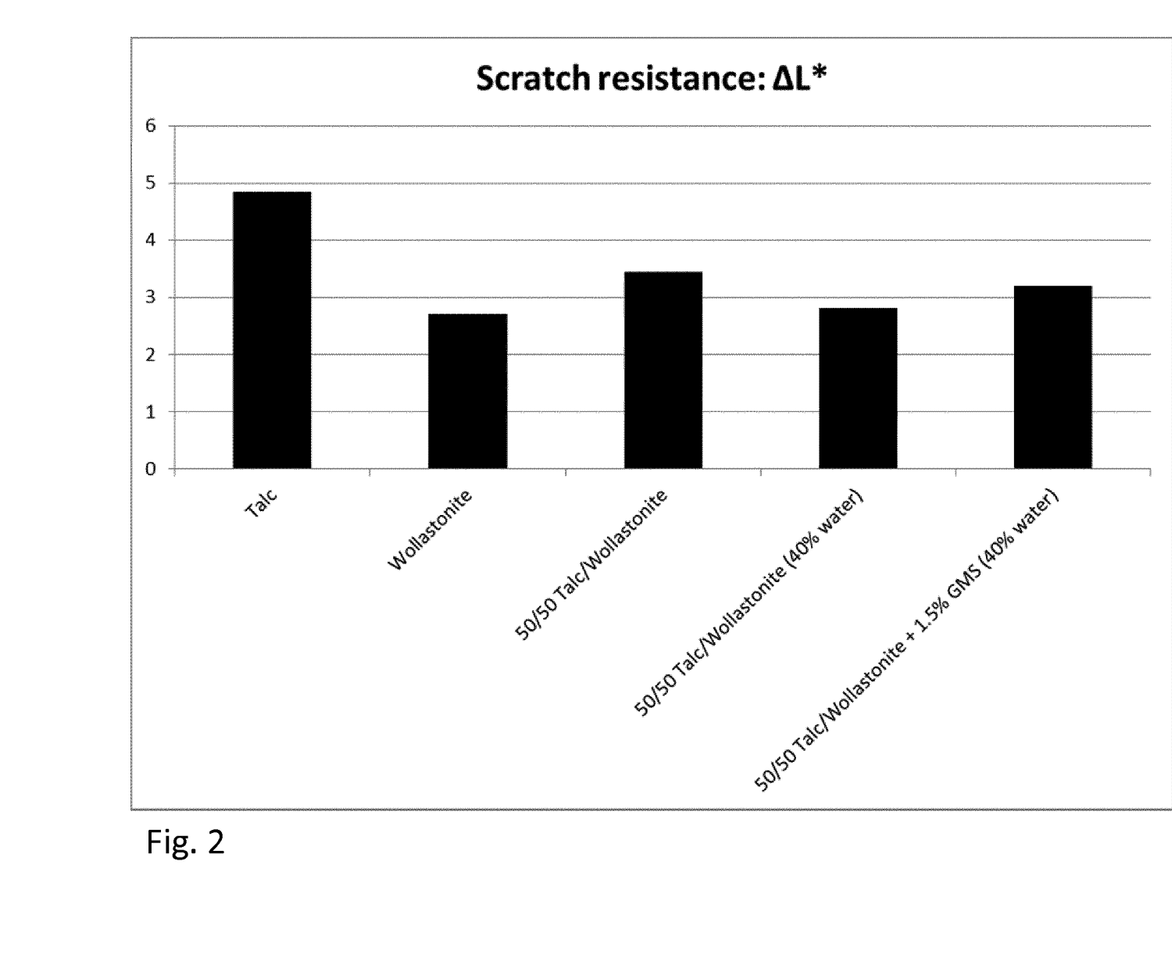
FIG. 2 is a plot summarising the Scratch resistance of a number of compositions described in the Examples.

FIG. 2 shows the scratch resistance, ΔL*, as determined by Erichsen scratch test, according to GMW 14688 Method A with a load of 10N, for grained plaques formed from two reference polymer compositions and three polymer compositions incorporating blends of talc and wollastonite. The ΔL* of the polymer compositions incorporating mineral blends including both talc and wollastonite were found to be substantially lower than the values of ΔL* for the polymer composition incorporating pure talc, closer to the value measured for the polymer composition incorporating pure wollastonite. In fact, the ΔL* of the polymer compositions incorporating both talc and wollastonite in a 1:1 weight ratio were found to be lower than would be predicted by taking the average of the ΔL* of the pure talc and wollastonite compositions.

Figure 3:
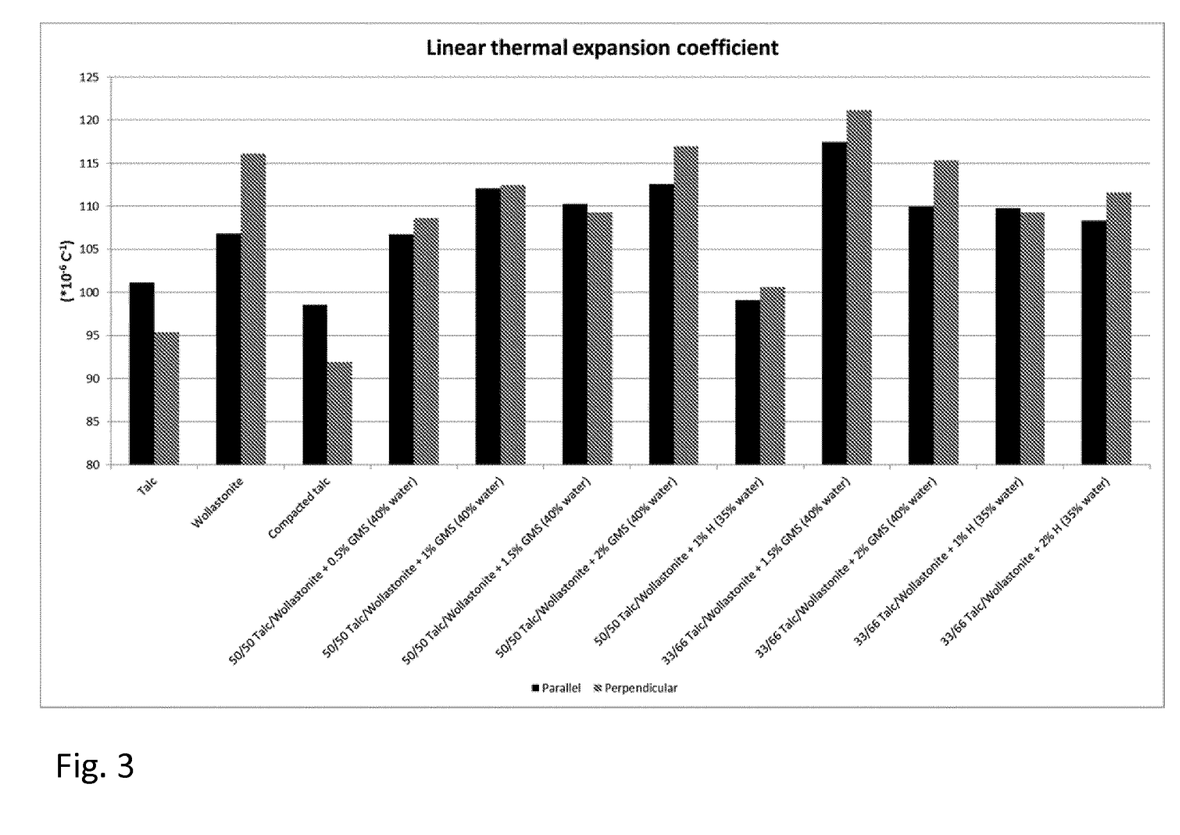
FIG. 3 is a plot summarising the linear thermal expansion coefficient anisotropy of a number of compositions described in the Examples.

FIG. 3 shows the linear thermal expansion coefficient measured along parallel and perpendicular directions for injection-moulded samples formed from a number of different polymer compositions. The parallel and perpendicular directions were defined relative to the plastic flow directions during injection moulding of the samples. The thermal expansion coefficients were measured by heating annealed samples from 23° C. up to 70° C. at a rate of 1.2° C./minute and measuring the expansion of the samples along the parallel and perpendicular axes using two strain gauges. The difference between parallel and perpendicular values of the linear thermal expansion coefficients is a measure of thermal expansion coefficient anisotropy. The thermal expansion coefficient anisotropy was generally found to be lower for compositions incorporating both talc and wollastonite than the thermal expansion coefficient anisotropy of compositions incorporating the pure reference fillers.

The invention claimed is:
1. A method comprising adding a mineral filler comprising talc and wollastonite to a polymer composition, wherein the mineral filler is a compressed granulated mineral filler having a tapped density in accordance with ISO 787/11 of from about 0.4 g/cm³ to about 1.4 g/cm³ and wherein the talc has a $d_{50}$ of from about 0.5 μm to about 2.0 μm.
2. The method according to claim 1, wherein the mineral filler comprises from about 25.0 wt. % to about 75.0 wt. %, of talc, and from about 25.0 wt. % to about 75.0 wt. %, of wollastonite, based on the total weight of non-aqueous components in the mineral filler.
3. The method according to claim 1, wherein the wollastonite has a $d_{50}$, measured by laser scattering, of from about 1.0 μm to about 15.0 μm.
4. The method according to claim 1, wherein the talc has a platy particle morphology and/or the wollastonite has a needle-shaped particle morphology and.
5. The method according to claim 4, wherein the wollastonite has an average particle diameter of from about 1.0 μm to about 15.0 μm and an average particle length of from about 20.0 μm to about 100.0 μm.
6. The method according to claim 1, wherein the mineral filler comprises an organic binder selected from: stearic acid or its salts, paraffin, glycerol monostearate, polyethylene glycol, ethylene-vinyl acetate, a blend of fatty ester copolymers with acidic groups, polyoxyethylene stearate, pro- pylene glycol monostearate, alkyl or ester modified siloxane, alkane sultanate, or mixtures thereof.

7. The method according to claim 1, wherein the mineral filler comprises no greater than 1.0 wt. % of water based on the total weight of the mineral filler.

8. The method according to claim 1, wherein the polymer composition comprises one or more of the following: polyolefins; polypropylene copolymer; polycarbonate alloys; polyamides.

9. The method of claim 1, further comprising extrusion of the polymer composition with the wollastonite-containing mineral filler.

10. The method according to claim 1, wherein the mineral filler is in the form of a brick, briquette, pellet, pressing, mould, preform, spray-dried powder, tablet, A aggregate, rod, granulate or agglomerate, or any mixture thereof.

11. The method according to claim 1, wherein the ratio of the weight of talc to the weight of wollastonite in the mineral filler is from about 1:4 to about 4:1.

12. The method according to claim 11, wherein the mineral filler comprises from about 25.0 wt. % to about 75.0 wt. of talc and from about 25.0 wt. % to about 75.0 wt. % of wollastonite, based on the total weight of non-aqueous components in the mineral filler.

13. The method according to claim 12, wherein the wollastonite has a $d_{50}$, measured by laser scattering, of from about 1.0 μm to about 15.0 μm.

14. The method according to claim 13, wherein the talc has a platy particle morphology and the wollastonite has a needle-shaped particle morphology.

15. The method according to claim 14, wherein:
the mineral filler comprise an organic binder selected from: stearic acid or its salts, paraffin, glycerol monostearate, polyethylene glycol, ethylene-vinyl acetate, a blend of fatty ester copolymers with acidic groups, polyoxyethylene stearate, propylene glycol monostearate, alkyl or ester modified siloxane, alkane sultanate, or mixtures thereof; and
the polymer composition comprises one or more of the following: polyolefins, for example, polypropylene, thermoplastic polyolefins, or polyethylene; polypropylene copolymer; polycarbonate alloys; polyamides.

16. The method according to claim 15, wherein the mineral filler comprises no greater than 1.0 wt. % of water based on the total weight of the mineral filler.

17. A method comprising adding a mineral filler comprising talc and wollastonite to a polymer composition, wherein the mineral filler is a compressed granulated mineral filler having a tapped density in accordance with ISO 787/11 of from about 0.4 g/cm$^3$ to about 1.4 g/cm$^3$.

18. A mineral filler for a polymer composition, the mineral filler comprising, based on the total weight of non-aqueous components in the mineral filler:
from about 25.0 wt. % to about 75.0 wt. % of talc, wherein the talc has a $d_{50}$ of from about 0.5 μm to about 2.0 μm;
from about 25.0 wt. % to about 75.0 wt. %, of wollastonite; and
from about 0.1 wt. % to about 10.0 wt. %, of organic binder;
wherein the mineral filler is a compressed granulated mineral filler having a tapped density in accordance with ISO 787/11 of from about 0.4 g/cm$^3$ to about 1.4 g/cm$^3$.

19. A polymer composition comprising the mineral filler according to claim 18.

20. An article of manufacture comprising the polymer composition of claim 19.

* * * * *

UNITED STATES PATENT AND TRADEMARK OFFICE
CERTIFICATE OF CORRECTION

PATENT NO. : 12,037,476 B2
APPLICATION NO. : 17/251382
DATED : July 16, 2024
INVENTOR(S) : Caroline Abler et al.

Page 1 of 1

It is certified that error appears in the above-identified patent and that said Letters Patent is hereby corrected as shown below:

In the Claims

Claim 4, Column 24, Line 58, "needle-shaped particle morphology and." should read --needle-shaped particle morphology.--.

Claim 15, Column 25, Line 32, "the mineral filler comprise an organic binder" should read --the mineral filler comprises an organic binder--.

Signed and Sealed this
Seventeenth Day of September, 2024

Katherine Kelly Vidal
*Director of the United States Patent and Trademark Office*